(12) United States Patent
Shimizu et al.

(10) Patent No.: US 8,871,369 B2
(45) Date of Patent: Oct. 28, 2014

(54) HERMETIC BATTERY

(75) Inventors: Keisuke Shimizu, Osaka (JP);
Tomohiko Yokoyama, Osaka (JP);
Masato Fujikawa, Osaka (JP);
Yasunari Sugita, Osaka (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 13/318,708

(22) PCT Filed: Apr. 7, 2011

(86) PCT No.: PCT/JP2011/002080
§ 371 (c)(1),
(2), (4) Date: Nov. 3, 2011

(87) PCT Pub. No.: WO2011/145263
PCT Pub. Date: Nov. 24, 2011

(65) Prior Publication Data
US 2012/0196163 A1    Aug. 2, 2012

(30) Foreign Application Priority Data
May 17, 2010    (JP) ................................. 2010-112760

(51) Int. Cl.
*H01M 10/34* (2006.01)
*H01M 10/52* (2006.01)
*H01M 2/12* (2006.01)

(52) U.S. Cl.
CPC ............... *H01M 2/12* (2013.01); *Y02E 60/122* (2013.01); *Y02E 60/12* (2013.01); *Y02T 10/7011* (2013.01)
USPC ................... 429/53; 429/54; 429/55; 429/56; 429/82; 429/85

(58) Field of Classification Search
CPC ..... H01M 2/12; H01M 2/1223; H01M 2/1229
USPC .......................................... 429/53–56, 82, 85
See application file for complete search history.

(56) References Cited

U.S. PATENT DOCUMENTS

2004/0214075 A1* 10/2004 Abe ................................ 429/56
2011/0008654 A1* 1/2011 Kim et al. ...................... 429/56

FOREIGN PATENT DOCUMENTS

JP    60-155174       10/1985
JP    06-333548    * 12/1994  ............... H01M 2/12

(Continued)

OTHER PUBLICATIONS

Federal Register, vol. 76, No. 27 issued Feb. 9, 2011 which details Supplementary Examination Guidelines for Determining Compliance with 35 U.S.C. 112 and for Treatment of Related Issues in Patent Applications (attached to this Office Action).*

(Continued)

*Primary Examiner* — Ula C. Ruddock
*Assistant Examiner* — Amanda Barrow
(74) *Attorney, Agent, or Firm* — McDermott Will & Emery LLP

(57) ABSTRACT

A hermetic battery including: a safety valve through which gas generated in the battery due to increase in pressure in the battery is discharged outside the battery, wherein the safety valve includes a first safety valve 9a, 10 which is operated at a first operating pressure, and a second safety valve 15a which is operated at a second operating pressure higher than the first operating pressure, a rate at which the gas is discharged while the second safety valve 15a is operated is higher than a rate at which the gas is discharged while the first safety valve 9a, 10 is operated, and the first safety valve 9a, 10 is closed at least while the second safety valve 15a is operated.

5 Claims, 7 Drawing Sheets

(56) References Cited

FOREIGN PATENT DOCUMENTS

| JP | H06-333548 | A | | 12/1994 | |
|----|------------|---|---|---------|---|
| JP | 09-115498  | A | | 5/1997  | |
| JP | 09-120811  |   | * | 5/1997  | ............ H01M 2/12 |
| JP | H09-120811 | A | | 5/1997  | |
| JP | 2001-185113 | | | 7/2001  | |
| JP | 2003-297323 | | | 10/2003 | |
| JP | 2003-297324 | | | 10/2003 | |
| JP | 2004-063254 | | | 2/2004 | |

OTHER PUBLICATIONS

International Search Report Issued in International Patent Application No. PCT/JP2011/002080 dated May 12, 2011.
English Translation of the Search Report along with Chinese Office Action issued in Chinese Patent Application No. 201180001924.8 mailed Feb. 17, 2014.

* cited by examiner

HERMETIC BATTERY

RELATED APPLICATIONS

This application is the U.S. National Phase under 35 U.S.C. §371 of International Application No. PCT/JP2011/002080, filed on Apr. 7, 2011, which in turn claims the benefit of Japanese Application No. 2010-112760, filed on May 17, 2010, the disclosures of which Applications are incorporated by reference herein.

TECHNICAL FIELD

The present invention relates to hermetic batteries including a safety valve through which gas generated in a battery due to increase in pressure in the battery is discharged outside the battery.

BACKGROUND ART

Hermetic secondary batteries which can be charged and discharged have high energy density. When an internal or external short circuit occurs, or the battery experiences abnormal heat generation or impact, charge/discharge reaction or chemical reaction occurs rapidly in the battery to cause rapid gas generation. This may expand or break a battery case. For this reason, most of the hermetic batteries are provided with a safety valve (an explosion-proof mechanism) through which the gas generated in the battery is discharged outside the battery when a pressure in the battery reaches a predetermined value.

As the safety valve provided in the hermetic battery, a sealing plate including a valve element which breaks when the pressure in the battery reaches the predetermined value may be provided to hermetically seal an opening of a battery case, or a thin part may be formed in part of the hermetic battery case. In the former safety valve, the valve element breaks when the pressure in the battery reaches the predetermined value, thereby discharging the gas generated in the battery outside the battery through a vent hole formed in the sealing plate. In the latter safety valve, the thin part of the battery case breaks when the pressure in the battery reaches the predetermined value, thereby discharging the gas generated in the battery outside the battery through the broken part of the battery case.

In the former safety valve, an area of the vent hole formed in the sealing plate cannot be sufficiently large. Thus, when the gas is generated faster than the gas is discharged, the safety valve cannot function well, and the pressure in the battery may increase to expand or break the battery case. In the latter safety valve, a pressure at which the thin part breaks, i.e., an operating pressure of the safety valve, has to be set high to ensure strength of the battery case. Thus, when the pressure in the battery has increased due to an abnormal event, it takes long time until the safety valve is operated, for which high temperature gas is generated to increase a temperature of the battery. This may thermally damage a device in which the battery is inserted.

In view of such disadvantages, Patent Document 1 describes a hermetic battery including a safety valve formed with a sealing plate including a valve element, and a safety valve formed with a battery case including a thin part. According to the technology of Patent Document 1, a pressure at which the thin part breaks is higher than a pressure at which the valve element breaks. Thus, when the gas is generated slowly, the generated gas can easily be discharged by breaking the valve element only, thereby reducing the increase in battery temperature. When the gas is generated rapidly, the thin part of the battery case breaks, thereby quickly discharging the gas, and preventing the break of the battery case.

CITATION LIST

Patent Document

[Patent Document 1] Japanese Patent Publication No. H06-333548

SUMMARY OF THE INVENTION

Technical Problem

Patent Document 1 is advantageous because the two safety valves which break at different pressures (at different operating pressures), and discharge the gas at different rates are combined to solve the problems, such as the increase in battery temperature, the break of the battery case, etc., based on a mode of gas generation (a mode of pressure increase).

However, according to the combination of the safety valves described in Patent Document 1, the pressure in the battery increases with the safety valve which is operated at a lower operating pressure (the sealing plate with the valve element) being operated. Thus, it takes long time until the safety valve which is operated at a higher operating pressure (the thin part of the battery case) is operated, for which the temperature of the battery excessively increases, and the device in which the battery is inserted may thermally be damaged. In addition, an electrolytic solution and flammable gas discharged through the safety valve which is operated at the lower operating pressure in an early stage of the gas generation are mixed with high temperature gas discharged through the safety valve which is operated at the higher operating pressure in the rapid gas generation. This may bring about reaction between the electrolytic solution or the flammable gas and the high temperature gas in the device in which the battery is inserted, and the device in which the battery is inserted may thermally be damaged.

In view of the foregoing, the present invention has been achieved. The present invention is mainly concerned with providing a highly safe hermetic battery which can reliably discharge the gas generated in the battery, and can reduce the thermal damage to the device in which the battery is inserted as much as possible based on a mode of gas generation (a mode of pressure increase).

Solution to the Problem

In view of the above concern, the present invention employs, as a safety valve which releases the pressure in the battery, a first safety valve which is operated at a low operating pressure, and discharges gas at a low rate, and a second safety valve which is operated at a high operating pressure, and discharges the gas at a high rate. The first safety valve is closed while the second safety valve is operated.

Specifically, the first safety valve is operated in an early stage where relatively low temperature gas is generated slowly. Then, in a stage where high temperature gas is generated rapidly, the first safety valve is closed to accelerate the increase in pressure in the battery, thereby operating the second safety valve. Thus, time elapsed until the second safety valve is operated can be reduced, and mixing of the electrolytic solution and flammable gas discharged through the first safety valve and the high temperature gas discharged through the second safety valve can be prevented. As a result, the gas generated in the battery can reliably be discharged outside the battery, and the thermal damage to the device in which the battery is inserted can be reduced as much as possible.

The hermetic battery of the present invention is a hermetic battery including: a safety valve through which gas generated in the battery due to increase in pressure in the battery is discharged outside the battery, wherein the safety valve includes a first safety valve which is operated at a first operating pressure, and a second safety valve which is operated at a second operating pressure higher than the first operating pressure, a rate at which the gas is discharged while the second safety valve is operated is higher than a rate at which the gas is discharged while the first safety valve is operated, and the first safety valve is closed at least while the second safety valve is operated.

In a preferred embodiment, the first safety valve includes a valve element which is provided in the battery, and breaks when the pressure in the battery reaches the first operating pressure, and a vent hole which is formed in a sealing plate sealing an opening of a battery case to release the pressure in the battery outside the battery through the broken valve element, and part of the broken valve element is deformed due to increase in pressure in the battery, and closes the vent hole at least at the second operating pressure.

In a preferred embodiment, the second safety valve is formed with a thin part which is formed in a bottom or a side of the battery case, and breaks when the pressure in the battery reaches the second operating pressure.

Advantages of the Invention

The present invention can provide a highly safe hermetic battery which can reliably discharge the gas generated in the battery outside the battery, and can reduce thermal damage to a device in which the battery is inserted as much as possible.

DESCRIPTION OF EMBODIMENTS

An embodiment of the present invention will be described below with reference to the drawings. The present invention is not limited to the following embodiment. Various modifications can be made to the embodiment within the scope of the present invention. The embodiment may be combined with other embodiments.

Figure 1:
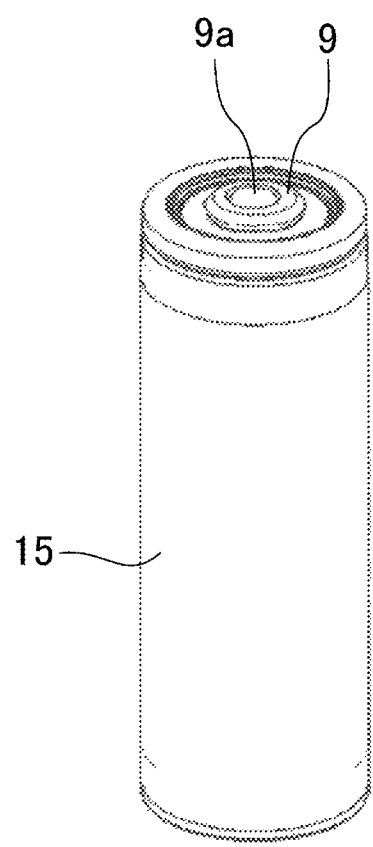
FIG. 1 is a perspective view illustrating a cylindrical nonaqueous electrolyte secondary battery according to an embodiment of the present invention.
Figure 2:
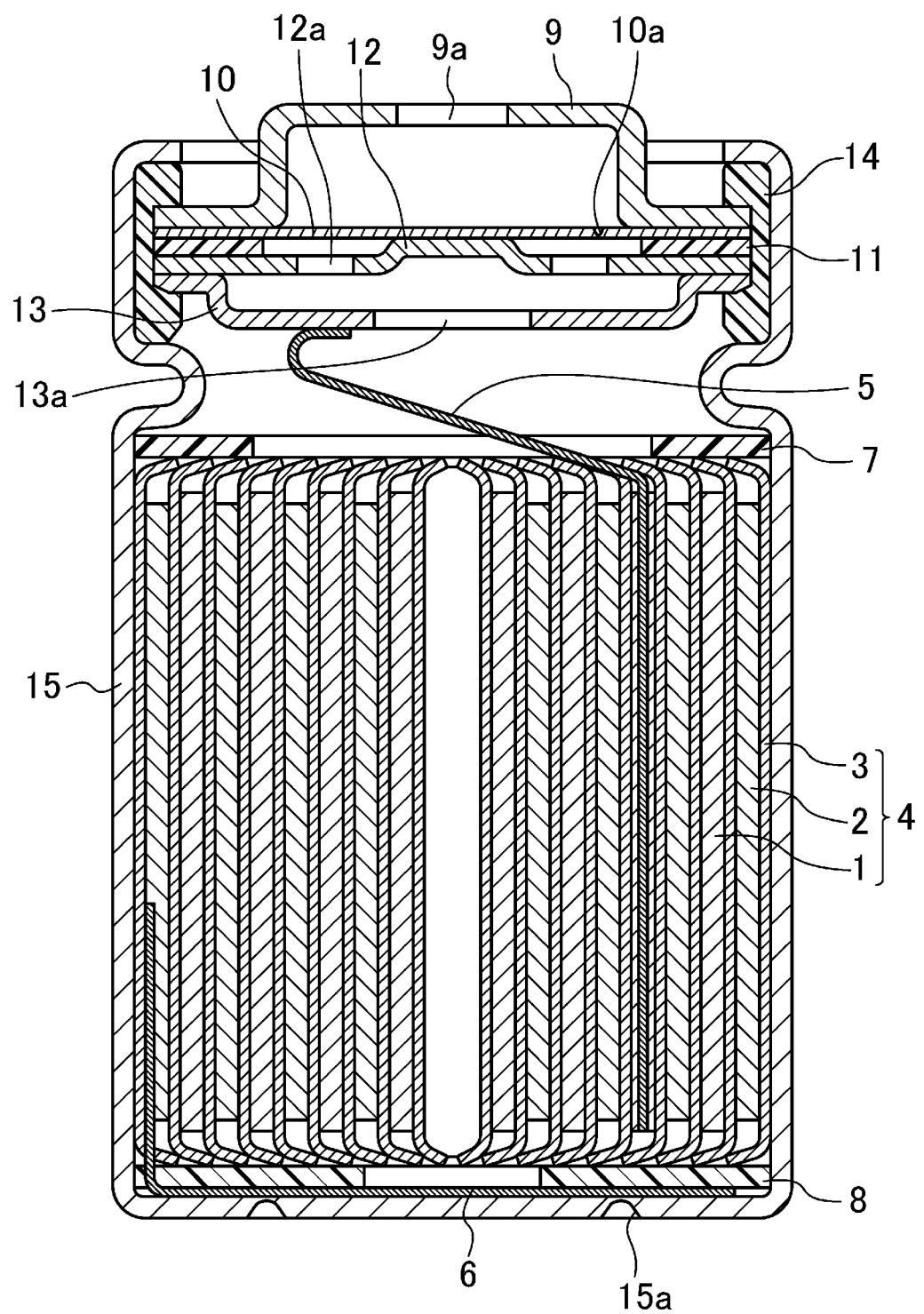
FIG. 2 is a cross-sectional view illustrating the cylindrical nonaqueous electrolyte secondary battery according to the embodiment of the present invention.
Figure 3:
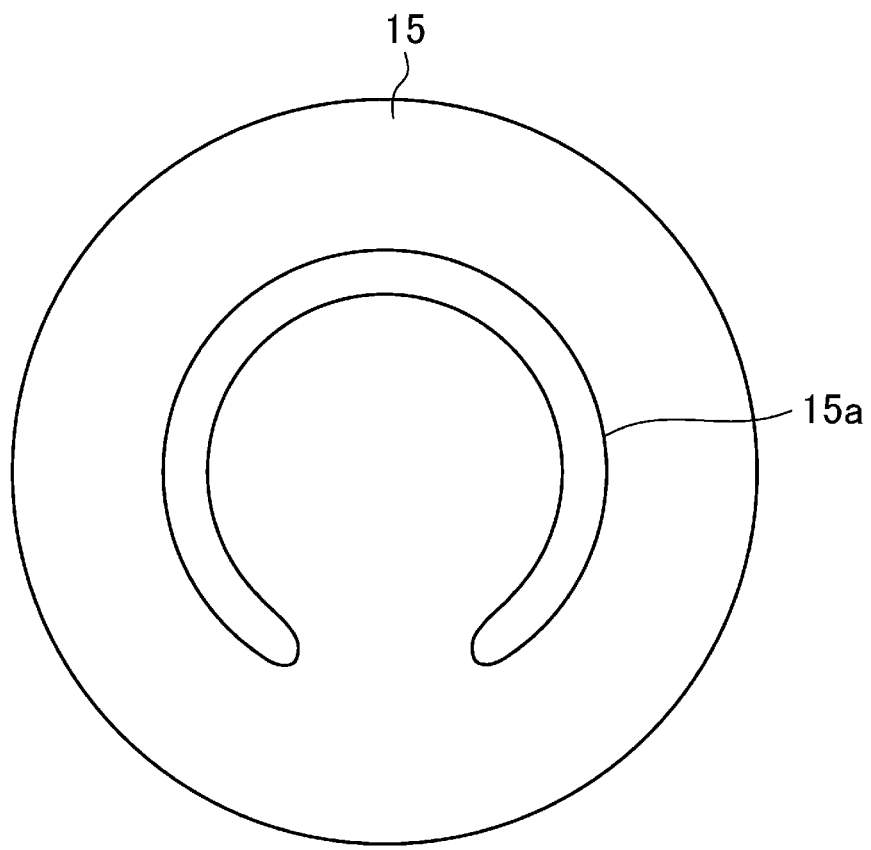
FIG. 3 is a bottom view illustrating the cylindrical nonaqueous electrolyte secondary battery according to the embodiment of the present invention.

FIGS. 1-3 show a cylindrical nonaqueous electrolyte secondary battery according to an embodiment of the present invention. FIG. 1 is a perspective view, FIG. 2 is a cross-sectional view, and FIG. 3 is a bottom view.

As shown in FIG. 2, an electrode group 4 including a positive electrode 1 and a negative electrode 2 wound with a separator (a porous insulating layer) 3 interposed therebetween, and a nonaqueous electrolytic solution (not shown) are placed in a cylindrical battery case 15 having a closed end. Ring-shaped insulators 7 and 8 are arranged at upper and lower ends of the electrode group 4, respectively. The positive electrode 1 is connected to a filter 13 through a positive electrode lead 5, and the negative electrode 2 is connected to a bottom of the battery case 15 which also functions as a negative electrode terminal through a negative electrode lead 6.

The filter 13 is connected to an inner cap 12, and a protrusion of the inner cap 12 is connected to a metallic valve element 10. The valve element 10 is connected to a sealing plate 9 which also functions as a positive electrode terminal. The sealing plate 9, the valve element 10, the inner cap 12, and the filter 13 are integrated to seal an opening of the battery case 15 with a gasket 14 interposed therebetween.

The valve element 10 includes a thin part 10a which breaks when a pressure in the battery reaches a predetermined value (a first operating pressure). A vent hole 9a is formed in the sealing plate 9 to discharge gas generated in the battery outside the battery through the broken valve element 10. The valve element 10 and the vent hole 9a constitute a first safety valve.

As shown in FIG. 3, a thin part 15a which breaks when the pressure in the battery reaches a predetermined value (a second operating pressure) is formed in the bottom of the battery case 15. The thin part 15a formed in the bottom of the battery case 15 constitutes a second safety valve.

A pressure at which the thin part 15a of the bottom of the battery case 15 breaks is higher than a pressure at which the thin part 10a of the valve element 10 breaks. Specifically, the second operating pressure for the second safety valve is higher than the first operating pressure for the first safety valve. The thin part 15a is formed in the bottom of the battery case 15 in such a manner that an area of an opening formed in the battery case 15 when the thin part 15a breaks is larger than an area of an opening of the vent hole 9a formed in the sealing plate 9. Specifically, a rate at which the gas is discharged while the second safety valve is operated is higher than a rate at which the gas is discharged while the first safety valve is operated. In general, an area of an opening formed in the valve element 10 when the thin part 10a of the valve element 10 breaks is larger than the area of the opening of the vent hole 9a formed in the sealing plate 9. Thus, the rate at which the gas is discharged while the first safety valve is operated is determined by the opening area of the vent hole 9a formed in the sealing plate 9.

Figure 4:
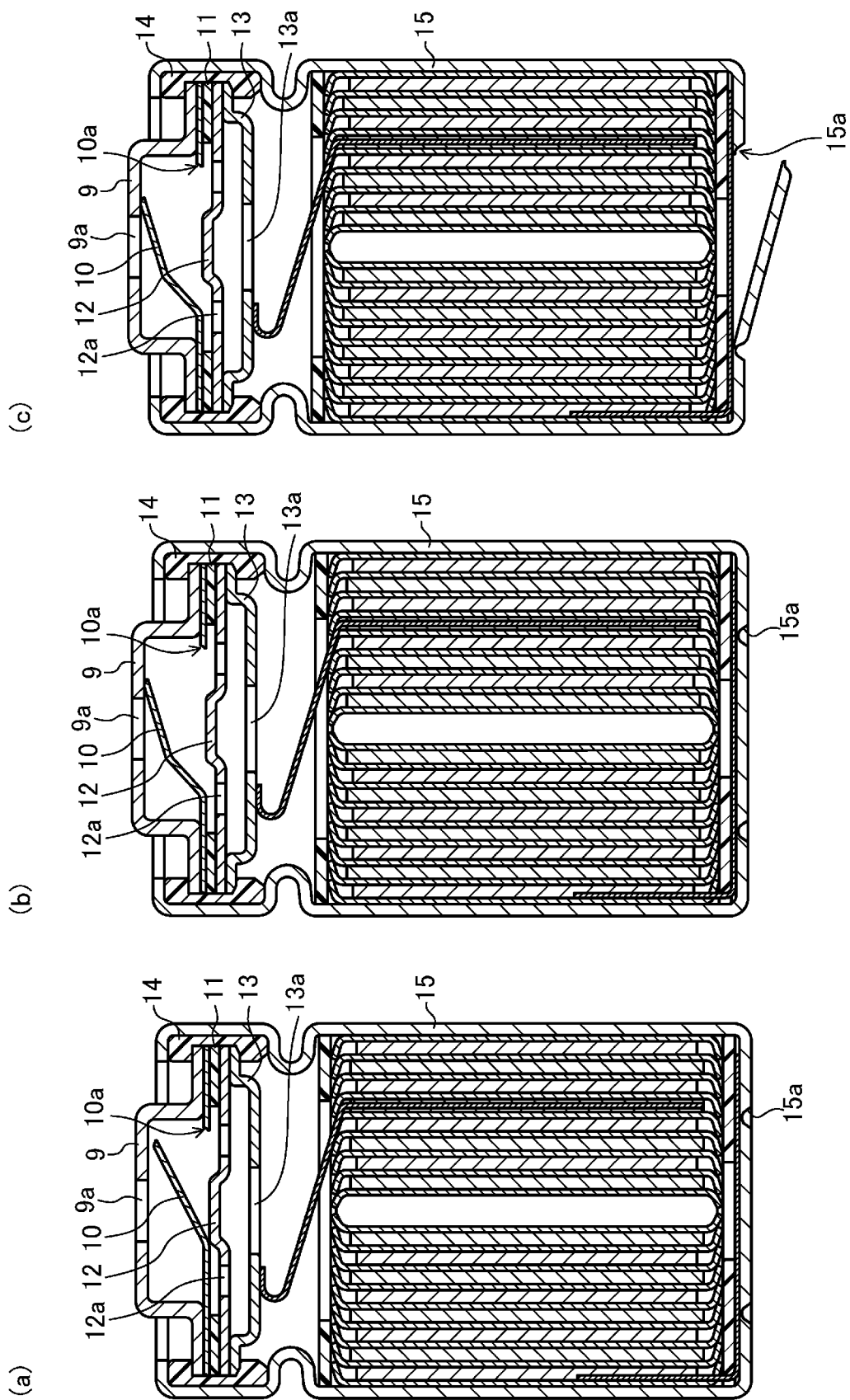
FIGS. 4(a)-4(c) are partial cross-sectional views illustrating how a safety valve according to the embodiment of the present invention is operated.

Referring to FIGS. 4(a)-4(c), how the first and second safety valves of the present embodiment are operated will be described below.

FIG. 4(a) shows that the first safety valve is operated in an early stage of gas generation. When a temperature of the battery is gradually increased by overcharge etc., and the electrolytic solution in the hermetically sealed battery case 15 is vaporized or decomposed, the pressure in the battery exceeds the first operating pressure, thereby breaking the thin part 10a of the valve element 10. Thus, a pressure in the battery is released outside the battery through an opening 13a of the filter 13, an opening 12a of the inner cap 12, the broken part of the valve element 10, and the vent hole 9a of the sealing plate 9. In this stage, relatively low temperature gas is generated slowly. When the valve element 10 breaks, the electrolytic solution and flammable gas are discharged outside the battery through the vent hole 9a of the sealing plate 9.

FIG. 4(b) shows that the first safety valve is closed when the temperature of the battery is further increased to cause rapid chemical reaction in the battery, thereby rapidly generating high temperature gas. In this stage, part of the broken valve element 10 is deformed and lifted toward the sealing plate 9 due to increase in pressure of the high temperature gas discharged in large quantities, thereby closing the vent hole 9a. To close the vent hole 9a with the part of the broken valve element 10, an end of the broken part of the valve element 10 needs to meet the sealing plate 9. Thus, a distance between the sealing plate 9 and the valve element 10, and a position of the thin part 10a formed in the valve element 10, etc., may suitably be determined in view of the size of the vent hole 9a.

FIG. 4(c) shows that the second safety valve is operated when the pressure in the battery is further increased with the first safety valve being closed. Since the discharge of the gas through the first safety valve is stopped, the pressure in the battery increases rapidly. When the pressure in the battery exceeds the second operating pressure, the thin part 15a of the battery case 15 breaks to discharge the high temperature gas generated in the battery outside the battery through the broken part of the battery case 15.

Thus, the safety valve of the hermetic battery of the present invention includes the first safety valve which is operated at the first operating pressure, and the second safety valve which is operated at the second operating pressure higher than the first operating pressure. A rate at which the gas is discharged while the second safety valve is operated is higher than a rate at which the gas is discharged while the first safety valve is operated. The first safety valve is closed at least while the second safety valve is operated.

With this configuration, the first safety valve is operated in the early stage of the gas generation where the relatively low temperature gas is generated slowly, and then the second safety valve is operated after the first safety valve is closed in the stage where the high temperature gas is generated rapidly. Thus, time elapsed until the second safety valve is operated can be reduced, and mixing of the electrolytic solution and the flammable gas discharged through the first safety valve with the high temperature gas discharged through the second safety valve can be prevented. This can provide a highly safe hermetic battery which can reliably discharge the gas generated in the battery outside the battery, and can reduce thermal damage to a device in which the battery is inserted as much as possible.

In the present invention, the first safety valve can be closed at least while the second safety valve is operated. The first safety valve is preferably closed when the pressure in the battery has increased due to generation of the high temperature gas which is 400° C. or higher. When the temperature in the battery is 400° C. or higher, chemical reaction occurs rapidly to cause rapid generation of the high temperature gas.

In the present invention, closing the first safety valve does not necessarily designate perfect closing. The first safety valve may be closed to such a degree that the discharge of the gas through the first safety valve can be reduced enough to reduce the time elapsed until the second safety valve is operated.

The first operating pressure at which the first safety valve is operated, and the second operating pressure at which the second safety valve is operated are not determined uniquely, but may suitably be determined based on the type of the battery used, a presumable mode of gas generation (a mode of pressure increase), etc. The second operating pressure is set lower than a withstanding pressure of the battery case (or a withstanding pressure of the sealing plate), but is preferably set to 4-8 MPa for the following reasons. When the second operating pressure is lower than 4 MPa, the thin part in the bottom of the battery case breaks upon receiving small impact (e.g., when the battery falls), and the electrolytic solution may leak out of the battery. When the second operating pressure is 8 MPa or higher, the thin part in the bottom of the battery case does not quickly break in response to the rapid generation of the gas, and the sealing plate may be deformed to break the battery.

In the present invention, the "safety valve" indicates a mechanism with which the gas generated in the battery due to increase in pressure in the battery is discharged outside the battery, and is not necessarily limited to the example described in the present embodiment. For example, as other examples of the safety valve, a gasket or a packing which breaks at a predetermined pressure may be used to hermetically seal the battery, or an elastic body which is pressed onto the opening of the battery case, and is deformed due to the increase in pressure in the battery, thereby discharging the gas through a gap formed by the deformation, such as a resin, a spring, etc., may be used to hermetically seal the battery.

The mechanism for closing the safety valve according to the present invention is not particularly limited to the example described in the present embodiment. For example, FIGS. 5(a)-5(c) are partial cross-sectional views illustrating another example of the mechanism for closing the first safety valve.

Figure 5:
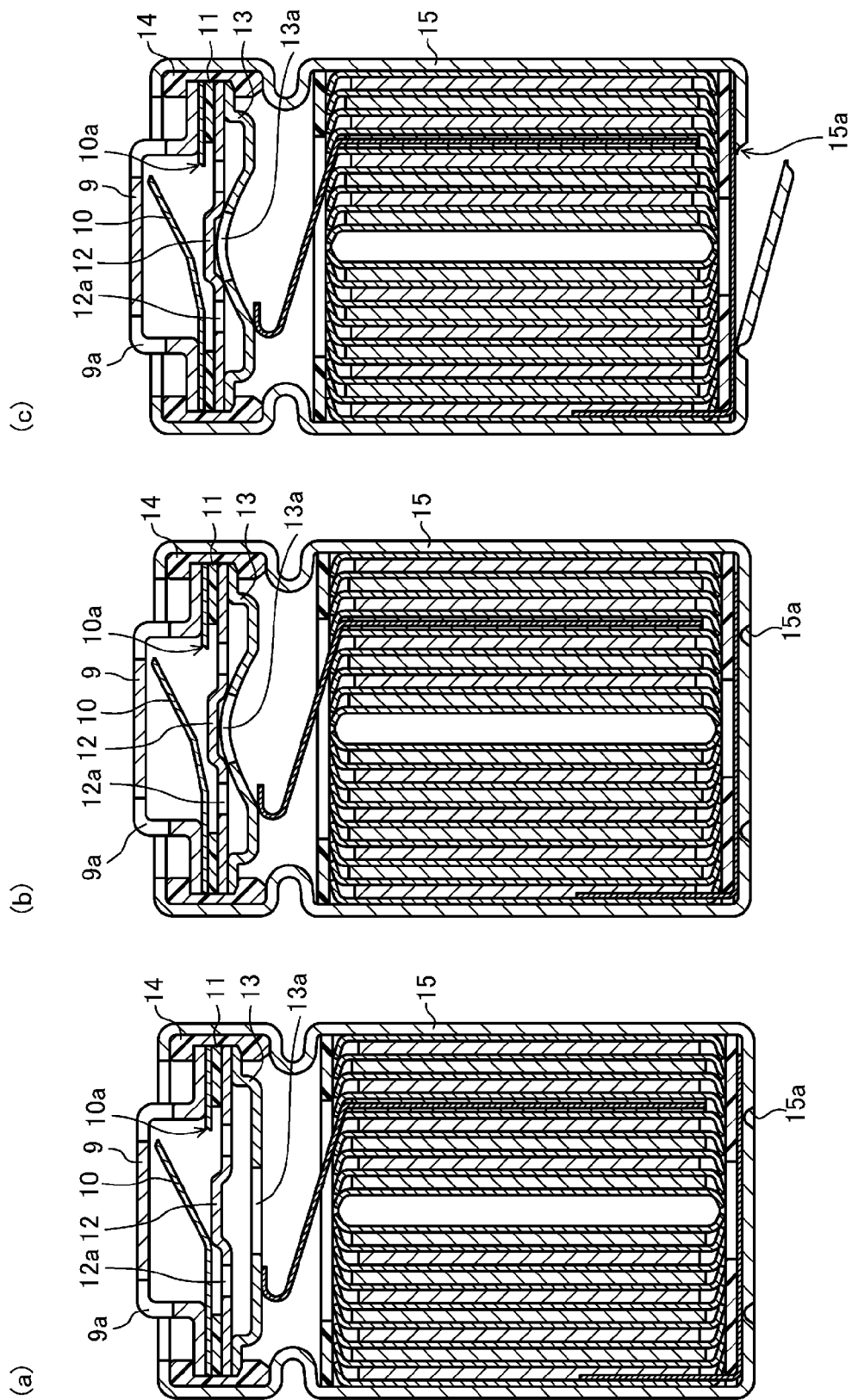
FIGS. 5(a)-5(c) are partial cross-sectional views illustrating how a safety valve according to another embodiment of the present invention is operated.

FIG. 5(a) shows that the thin part 10a of the valve element 10 has broken in the early stage of the gas generation, i.e., the first safety valve is operated. FIG. 5(a) shows the same state as FIG. 4(a).

FIG. 5(b) shows that the first safety valve is closed when the temperature of the battery is further increased to cause rapid chemical reaction in the battery, thereby rapidly generating high temperature gas. In this stage, a center part of the filter 13 is deformed and lifted toward the inner cap 12 due to the increase in pressure increased due to increase in pressure of the high temperature gas discharged in large quantities, thereby closing the opening 13a of the filter 13 with the protrusion of the inner cap 12. Thus, a path through which the gas is discharged is closed.

FIG. 5(c) shows that the second safety valve is operated when the pressure in the battery is further increased with the first safety valve being closed. FIG. 5(c) shows the same state as FIG. 4(c).

Figure 6:
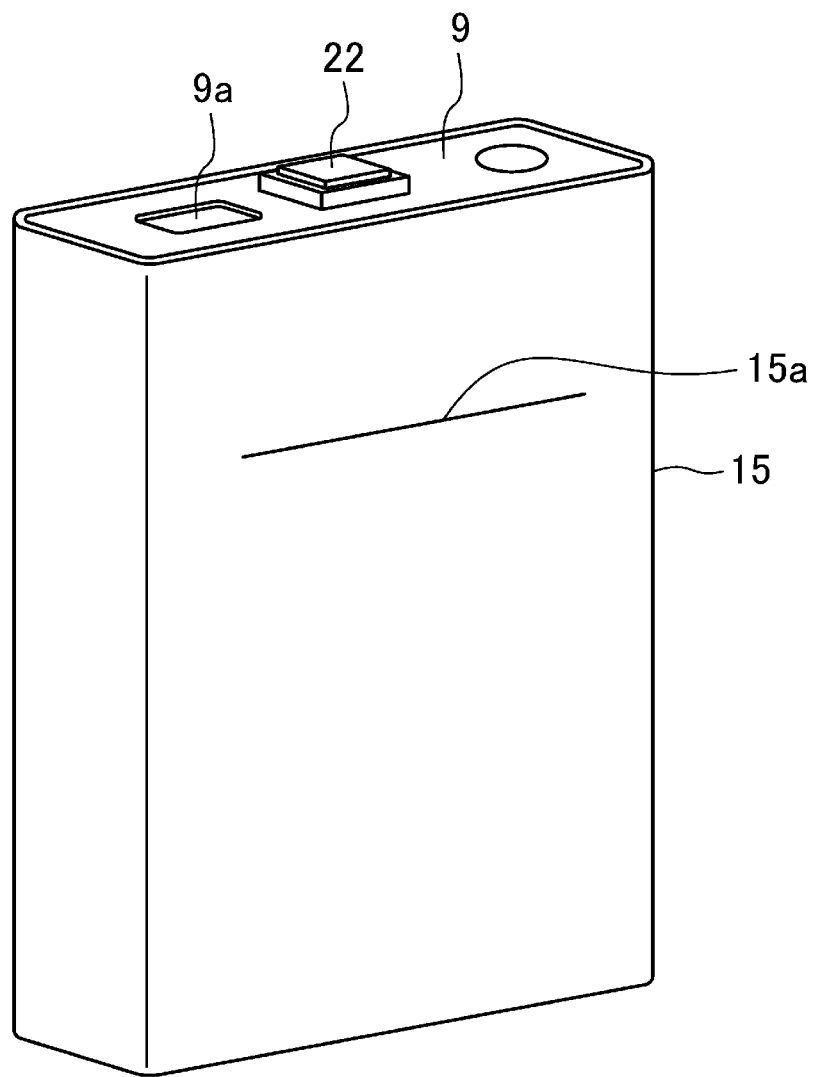
FIG. 6 is a perspective view illustrating a rectangular nonaqueous electrolyte secondary battery according to still another embodiment of the present invention.

Referring to FIGS. 6, and 7(a)-7(c), a rectangular nonaqueous electrolyte secondary battery as an example of the hermetic battery of the present invention will be described below. FIG. 6 is a perspective view of the rectangular nonaqueous electrolyte secondary battery, and FIGS. 7(a)-7(c) are partial cross-sectional views illustrating how the first safety valve and the second safety valve are operated.

As shown in FIGS. 6 and 7(a), an electrode group 4 which is wound into a flat shape is placed in a rectangular battery case 15. A positive electrode lead 5 connected to an end of a positive electrode (not shown) is connected to a lid 9 which also functions as a positive electrode terminal. A negative electrode lead 6 connected to an end of a negative electrode (not shown) is connected to a negative electrode terminal 22 formed in an opening of the lid 9 through a negative electrode connector plate 21. The negative electrode connector plate 21 is electrically insulated from the lid 9 by an insulator 20. An injection hole which is formed in the lid 9, and through which an electrolytic solution is injected, is closed by a plug 23.

Figure 7:
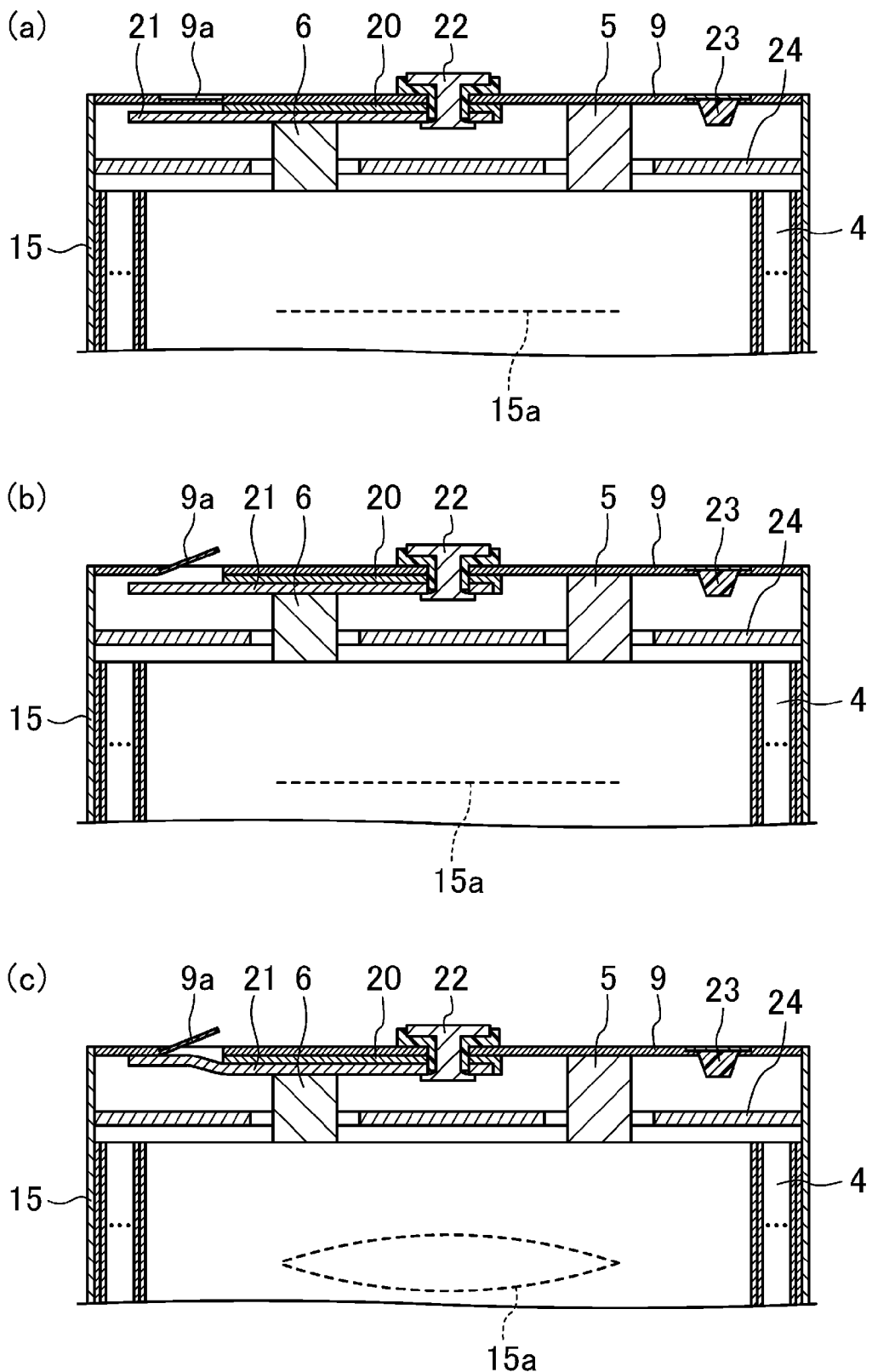
FIGS. 7(a)-7(c) are partial cross-sectional views illustrating how a safety valve of the rectangular nonaqueous electrolyte secondary battery according to the still another embodiment of the present invention is operated.

As shown in FIG. 7(*a*), a thin part 9*a* is formed in the lid 9. the thin part 9*a* constitutes the first safety valve which is operated at the first operating pressure. As shown in FIG. 6, a thin part 15*a* is formed in a side of the battery case 15. The thin part 15*a* constitutes the second safety valve which is operated at the second operating pressure.

FIG. 7(*b*) shows that the first safety valve is operated when the pressure in the battery exceeds the first operating pressure to break the thin part 9*a* of the lid 9 in an early stage of the gas generation.

FIG. 7(*c*) shows that the first safety valve is closed when the temperature of the battery is further increased to rapidly generate high temperature gas, and the second safety valve is operated when the pressure in the battery exceeds the second operating pressure with the first safety valve being closed. An end of the negative electrode connector plate 21 extends from an end of the insulator 20 to be positioned below the thin part 9*a* of the lid 9. The extending part of the negative electrode connector plate 21 is deformed and lifted toward the lid 9 due to increase in pressure of the high temperature gas discharged in large quantities, thereby closing an opening formed in the lid 9 by the broken thin part 9*a*. When the pressure in the battery increases to exceed the second operating pressure, the thin part 15*a* of the battery case 15 breaks to discharge the high temperature gas generated in the battery outside the battery through the broken part of the battery case 15.

The present invention has been described by way of the preferred embodiment. However, such description of the embodiments should not be construed as limiting, and thus, various modifications can be made thereto. For example, although the nonaqueous electrolyte secondary battery has been described in the above embodiment as an example of the hermetic battery, the present invention can also be applied to, e.g., lead-acid batteries, nickel-cadmium secondary batteries, nickel-metal hydride secondary batteries, alkaline dry batteries, etc. The type of the nonaqueous electrolyte secondary battery is not particularly limited. The present invention can also be applied to, e.g., lithium ion secondary batteries, lithium primary batteries, etc.

INDUSTRIAL APPLICABILITY

The hermetic battery of the present invention can suitably be used as power sources for electronic devices such as personal computers and cellular phones, electric vehicles, electric power tools, etc.

DESCRIPTION OF REFERENCE CHARACTERS

1 Positive electrode
2 Negative electrode
3 Separator
4 Electrode group
5 Positive electrode lead
6 Negative electrode lead
7, 8 Insulator
9 Sealing plate (lid)
9*a* Vent hole (thin part)
10 Valve element
10*a* Thin part
12 Inner cap
12*a* Opening
13 Filter
13*a* Opening
14 Gasket
15 Battery case
15*a* Thin part
20 Insulator
21 Negative electrode connector plate
22 Negative electrode terminal
23 Plug

The invention claimed is:

1. A hermetic battery comprising:
a safety valve through which gas generated in the battery due to increase in pressure in the battery is discharged outside the battery, wherein:
the safety valve includes a first safety valve configured to operate at a first operating pressure, and a second safety valve configured to operate at a second operating pressure higher than the first operating pressure,
the first safety valve is configured to discharge the gas at a first rate while the first safety valve operates,
the second safety valve is configured to discharge the gas at a second rate while the second safety valve operates, the second rate being larger than the first rate, and
the first and second safety valves are configured such that the first safety valve which has operated and been opened at the first operating pressure is again closed at least before the second safety valve operates,
the first safety valve includes:
a valve element provided in the battery and configured to break when the pressure in the battery reaches the first operating pressure; and
a vent hole which is formed in a sealing plate sealing an opening of a battery case to discharge the gas generated in the battery outside the battery through the broken valve element, and
the first safety valve is configured such that part of the broken valve element is deformed due to increase in pressure in the battery, and closes the vent hole at least at the second operating pressure.

2. The hermetic battery of claim 1, wherein the second safety valve is formed with a thin part formed in a bottom or a side of the battery case and configured to break when the pressure in the battery reaches the second operating pressure.

3. The hermetic battery of claim 1, wherein:
the hermetic battery is a nonaqueous electrolyte secondary battery, and
the first safety valve is configured to be closed when the pressure in the battery is increased by generation of high temperature gas of 400° C. or higher.

4. The hermetic battery of claim 1, wherein the second operating pressure at which the second safety valve operates is 4-8 MPa.

5. The hermetic battery of claim 1, wherein the hermetic battery is a cylindrical or rectangular nonaqueous electrolyte secondary battery.

* * * * *